United States Patent [19]

Hashimoto

[11] Patent Number: 5,764,919
[45] Date of Patent: Jun. 9, 1998

[54] DATA TRANSMISSION METHOD AND SYSTEM THEREFOR

[75] Inventor: Hiroshi Hashimoto, Wako, Japan

[73] Assignee: Honda Giken Kogyo Kabushiki Kaisha, Tokyo, Japan

[21] Appl. No.: 455,512

[22] Filed: May 31, 1995

Related U.S. Application Data

[62] Division of Ser. No. 195,776, Feb. 14, 1994, abandoned.

[30] Foreign Application Priority Data

| Feb. 15, 1993 | [JP] | Japan | 5-48559 |
| Feb. 15, 1993 | [JP] | Japan | 5-48560 |
| Mar. 15, 1993 | [JP] | Japan | 5-80216 |
| Mar. 18, 1993 | [JP] | Japan | 5-84079 |

[51] Int. Cl.$^6$ .................. G06F 13/37; G06F 13/42
[52] U.S. Cl. ............. 395/200.66; 395/200.67; 370/452; 370/476
[58] Field of Search ............. 395/200.13, 200.14, 395/200.16, 200.21, 200.11, 200.15, 200.06, 200.17, 200.1, 183.12, 184.01, 183.19; 340/825.07, 825.16, 825.5, 825.52; 379/106, 107; 364/241.8, 440.8; 370/85.1, 85.2, 85.3, 85.4, 85.5, 85.6, 94.1, 13, 14, 15, 450, 451, 452; 178/4.1 C

[56] References Cited

U.S. PATENT DOCUMENTS

| 4,551,721 | 11/1985 | Kozlik | 340/825.5 |
| 4,556,974 | 12/1985 | Kozlik |  |
| 4,560,985 | 12/1985 | Strecker et al. | 340/825.5 |
| 4,590,468 | 5/1986 | Stieglitz | 340/825.5 |
| 4,597,052 | 6/1986 | Matsuda | 395/184.01 |

(List continued on next page.)

FOREIGN PATENT DOCUMENTS

| 0137437 | 4/1985 | European Pat. Off. . |
| 0216372 | 4/1987 | European Pat. Off. . |
| 62-159539 | 7/1987 | Japan . |
| 1-57856 | 12/1989 | Japan . |
| 1-58900 | 12/1989 | Japan . |
| WO93/21713 | 10/1993 | WIPO . |

OTHER PUBLICATIONS

Elektronik, vol. 32, No. 11, Jun. 1983, Munchen DE, pp. 73–78, H. Eing UA. "Das lokale SP–Netwerk".

Mini Micro Conference Record, 8, Nov. 1983 New York, US, pp. 1–12, M. Steiglitz, "Efficient Token Passing Through Silicon".

IEEE/AIAA 7th Digital Avionics Systems Conference Proceedings, 13, Oct. 1986, Texas (US), pp. 234–241, J.W. Meyer "SAE AF-9B Draft Standard High Speed Token Passing Data Bus for Avionics Applications".

*Primary Examiner*—Mark H. Rinehart
*Attorney, Agent, or Firm*—Frishauf, Holtz, Goodman, Langer & Chick

[57] ABSTRACT

A data transmission system for a vehicle includes a plurality of control systems installed on the vehicle, and a network bus connecting the plurality of control systems with each other for circulating a transmission right through the plurality of control systems to thereby perform transmission of a message between the plurality of control systems. According to a first aspect, each of the control systems starts transmitting data when it is detected that the transmission right is not generated or lost from the system, and continues transmitting the data when no collision of data transmitted from the present control system with data transmitted from the rest of the plurality of control systems, or when by mediation for avoiding the collision is detected, it is determined to continue data transmission. According to another aspect, the maximum number of times of retransmission to be permitted is determined according to a type of failure in transmission identified, and the retransmission is performed so long as the number times of retransmission of the data does not exceed the maximum number of times of retransmission to be permitted. According to still another aspect, the message comprises a first response field for receiving a first acknowledging response output from a control system having received the transmission right, and a second response field for receiving a second acknowledging response output from a control system having received data.

4 Claims, 8 Drawing Sheets

U.S. PATENT DOCUMENTS

| | | | |
|---|---|---|---|
| 4,715,031 | 12/1987 | Crawford et al. | 340/825.5 |
| 4,725,834 | 2/1988 | Chang et al. | 340/825.5 |
| 4,766,530 | 8/1988 | Roslund | 340/825.5 |
| 4,825,362 | 4/1989 | Minami et al. | 395/200.13 |
| 4,860,006 | 8/1989 | Barall | 340/825.5 |
| 4,899,143 | 2/1990 | Gopinath et al. | 340/825.5 |
| 4,914,654 | 4/1990 | Matsuda et al. | |
| 4,964,076 | 10/1990 | Schurk | 340/825.5 |
| 5,079,759 | 1/1992 | Kajiyama | 370/13 |
| 5,311,172 | 5/1994 | Sadamori | 370/85.4 |
| 5,329,528 | 7/1994 | Akai et al. | 370/85.3 |
| 5,351,241 | 9/1994 | Yehonatan | 370/85.3 |
| 5,585,788 | 12/1996 | Hashimoto et al. | 340/825.5 |
| 5,586,118 | 12/1996 | Hashimoto et al. | 340/825.5 |

DATA TRANSMISSION METHOD AND SYSTEM THEREFOR

This is a division of application Ser. No. 08/195,776 filed Feb. 14, 1994 abandoned.

BACKGROUND OF THE INVENTION

1. Field of the Invention

This invention relates to a method of transmitting data and a system therefor between a plurality of electronic control units installed on an automotive vehicle via a common communication line connecting these electronic control units.

2. Prior Art

Conventionally, in performing mutual data transmission between a plurality of electronic control units (hereinafter referred to as the "ECU's" installed on an automotive vehicle via a common communication line (hereinafter referred to as "the network bus") connecting the ECU's, a token passing method is employed for circulating a transmission right round the ECU's in a predetermined sequence to permit an ECU having received the transmission right to send out data to the network bus.

When a data transmission system employing the token passing method is started, the following methods are conventionally known for initially rendering (i.e. generating) the transmission right to one of the ECU's:

(1) Fixed ECU method of initially rendering the transmission right to a particular ECU determined in advance in a fixed manner.

(2) Waiting method in which all the ECU's start transmitting data assuming that they are each initially rendered with the transmission right, stop transmitting data when collision of data occurs, and restart data transmission after waiting for predetermined waiting time periods set to the ECU's, respectively, repeatedly carrying out this procedure until no collision occurs, to thereby restrict an initial holder of the transmission right to one of the ECU's.

However, the fixed ECU method suffers from a problem that if the particular ECU to which the transmission right is to be initially rendered is in failure, the transmission right cannot be produced for ever.

With the waiting method as well, there is an inconvenience that it takes much time to generate the transmission right, and time is wastefully consumed before the ECU's start to cooperate as a network.

On the other hand, in the data transmission system using the token passing method, it is a known technique to add broadcast data to a message for transmission to transfer the transmission right to the next ECU, as disclosed e.g. in Japanese Patent Publication (Kokoku) No. 1-58900.

However, according to this conventional technique, the message data format is not constructed such that a sending end can confirm safe and accurate transfer of each of the transmission right and data, and hence there is room for improvement thereof to expedite the transmission.

Further, Japanese Patent Publication (Kokoku) No. 1-57856 (hereinafter referred to as "the first prior art") discloses a technique that when data transmission is not successfully carried out, retransmission of data is performed upon the transmission right returning to the present ECU after having been transferred round the ECU's, taking into consideration the fact that if retransmission of the data is carried out immediately, there is a high possibility of failure thereof.

Further, Japanese Provisional Patent Publication (Kokai) No. 62-159539 discloses a data transmission system (hereinafter referred to as "the second prior art") in which when transmission of the data is not successfully carried out, the data is retransmitted within a limit of a predetermined number of times, which number can be changed or set by another control system.

According to the first prior art, the retransmission of data is performed only after the transmission right has been transferred round the ECU's once even if the immediate transmission of data might be successful (e.g. when failure of transmission was caused by a noise during transmission), which is an inconvenience to be eliminated for prompt completion of data transmission.

Further, according to the second prior art, the retransmission of data is carried out immediately after failure thereof within the predetermined number of times set by the other control system. However, this number is not set by the sending end itself, and hence it is difficult to perform prompt reaction to failure of transmission.

Further, in making a check as to whether connection between one member (ECU) and another (ECU) of the network is safely established, a special message is sent out from the one member for a response from the other, based on which it is determined whether the connection is safely established.

When the special message is used, however, the data transmission and transfer of the transmission right cannot be performed while the special message is being sent out, which results in degraded transmission efficiency.

Further, when the other member (ECU) goes faulty or disconnected from the network, the state of the connection is not certain until the check therefor is carried out again, and hence there is a possibility of continuing to transfer the transmission right to the ECU disconnected.

SUMMARY OF THE INVENTION

It is a first object of the invention to provide a data transmission system for an automotive vehicle which is capable of enhancing data transmission efficiency by immediately generating a transmission right, i.e. initially rendering the transmission right to a sending end.

It is a second object of the invention to provide a data transmission system which properly permits retransmission of data when transmission has not been successfully carried out, while maintaining the balance between the retransmission of data and the circulation of the transmission right.

It is a third object of the invention to provide a data transmission system which is capable of detecting a disconnection of a unit from a network without degrading transmission efficiency of the system.

it is a fourth object of the invention to provide a method of transmitting data, which permits prompt confirmations as to whether the transfer of the transmission right and the transmission of data are carried out successfully, respectively, thereby smoothly circulating the transmission right.

To attain the first object of the invention, according to a first aspect of the invention, there is provided a data transmission system for a vehicle, including a plurality of control systems installed on the vehicle, and a network bus connecting the plurality of control systems with each other for circulating a transmission right through the plurality of control systems to thereby perform transmission of a message between the plurality of control systems.

The data transmission system according to the first aspect of the invention is characterized in that each of the plurality of control systems comprises:

transmitter-receiver means for transmitting data to or receiving data from the rest of the plurality of control systems via the network bus;

collision-detecting means for detecting a collision of data transmitted from the transmitter-receiver means with data transmitted from any of the rest of the plurality of control systems;

mediating means for performing mediation on the data transmitted from the transmitter-receiver means and having been detected to be collided with the data transmitted from any of the rest of the plurality of control system to direct the transmitter-receiver means to continue data transmission or stop the data transmission, for the purpose of avoiding the collision, monitor means for monitoring the transmission right; and control means for causing the transmitter-receiver means to start transmitting data when the monitoring means detects that the transmission right is not generated or lost from the system, and causing the transmitter-receiver means to obtain said transmission right and to continue transmitting the data when the collision-detecting means does not detect a collision of the data with data transmitted from the rest of the plurality of control systems, or when the mediating means directs the transmitter-receiver to continue data transmission.

Preferably, the data transmission system further comprises transfer means for transferring the transmission right to a subsequent control system in a predetermined manner, when the control means controls the transmitter-receiver means to continue the data transmission until the data transmission is completed.

Preferably, the mediating means compares the data transmitted from the transmitter-receiver means with the data received via the network bus from the rest of the plurality of control systems, bit by bit, based on the logic considering one of logical levels of transmission data as dominant, and the other of the logical levels of the transmission data as recessive, and directing the transmitter-receiver means to stop the data transmission when the data transmitted from the transmitter-receiver means and the data received from the network bus are different from each other.

More preferably, the transfer means transfers the transmission right to the subsequent control unit by increasing an address representative of the each of the plurality of control systems incorporating the transfer means by a predetermined number.

To attain the second object of the invention, according to a second aspect of the invention, there is provided a data transmission system for a vehicle, including a plurality of control systems installed on the vehicle, and a network bus connecting the plurality of control systems with each other for circulating a transmission right through the plurality of control systems to thereby perform transmission of a message between the plurality of control systems.

The data transmission system according to the second aspect of the invention is characterized in that each of the plurality of control systems-comprises:

transmitter-receiver means for transmitting data to or receiving data from the rest of the plurality of control systems via the network bus;

transmission failure-detecting means for detecting failure in transmission of the data;

failure type-identifying means for identifying a type of the failure in transmission of the data; and retransmission control means for determining the maximum number of times of retransmission to be permitted according to the type of failure in transmission identified by the failure type-identifying means, and causing the transmitter-receiver means to perform the retransmission so long as the number times of retransmission of the data does not exceed the maximum number of times of retransmission to be permitted.

Preferably, the transmitter-receiver means transfers the transmission right to another control system when the number of times of failure in transmission of the data exceeds the maximum number of times of transmission to be permitted.

Preferably, the type of failure in retransmission is classified into a case in which no acknowledging response is detected, and a case in which an error in transmission is detected.

Preferably, the retransmission control means sets the maximum number of times of retransmission to be permitted to a larger value when the error in transmission is detected than when no acknowledging response is detected.

To attain the third aspect of the invention, according to a third aspect of the invention, there is provided a data transmission system for a vehicle, including a plurality of control systems installed on the vehicle, and a network bus connecting the plurality of control systems with each other for circulating a transmission right through the plurality of control systems to thereby perform transmission of a message between the plurality of control systems, each of the plurality of control systems including transmitter-receiver means for transmitting data to or receiving data from the rest of the plurality of control systems via the network bus, transfer destination-setting means for setting a destination of transfer of the transmission right, acknowledging response-detecting means for detecting an acknowledging response output from another control system having received the transmission right, and abnormality-detecting means for detecting abnormality of the system.

The data-transmission system according to the third aspect of the invention is characterized in that:

the transfer destination-setting means sets a subsequent transfer destination when no acknowledging response is detected, and the abnormality-determining means determines that the system is abnormal, when setting of the transfer destination by the transfer destination-setting means has been performed round all of transfer destinations to be set.

Preferably, the data transmission system further comprises time-measuring means for measuring a predetermined time period elapsed after the start of the data transmission system, and inhibiting means for inhibiting the abnormality-determining means from determining abnormality of the system before the time-measuring means has measured the predetermined time period.

Preferably, the transfer destination-setting means sets the subsequent transfer destination by increasing an address indicative of the transfer destination by a predetermined number.

More preferably, the abnormality-determining means determines that the setting of the transmission right has been performed round the all of transfer destinations to be set, when the address of the transfer destination becomes identical to an address of the present control system having the transmission right.

To attain the fourth object of the invention, according to a fourth aspect of the invention, there is provided a data transmission method for connecting a plurality of control systems installed on a vehicle by at least one common signal line, and transmitting a message between the plurality of control systems while circulating a transmission right through the plurality of control systems.

The data transmission method according to the fourth aspect of the invention is characterized in that the message comprises a first response field for receiving a first acknowledging response output from a control system having received the transmission right, and a second response field for receiving a second acknowledging response output from a control system having received data.

Preferably, a processing corresponding to the first acknowledging response is performed in preference to a processing corresponding to absence of the second acknowledging response.

Preferably, the processing corresponding to the first acknowledging response is waiting for reception of the transmission right next time or continuation of transfer of the transmission right, and the processing corresponding to absence of the second acknowledging response is retransmission of the data.

To attain the fourth object, according to a fifth aspect of the invention, there is provided a data transmission method for connecting a plurality of control systems installed on a vehicle by at least one common signal line, and transmitting a message between the plurality of control systems while circulating a transmission right through the plurality of control systems.

The data transmission method according to the fifth aspect of the invention is characterized in that:

the message is classified into a first message having a first response field for receiving a first acknowledging response output from a control system having received the transmission right, and a second message having a second response field for receiving a second acknowledging response output from a control system having received data; and each of the plurality of control systems judges that transfer of the transmission right is completed irrespective of whether the second acknowledging response is detected or not, if the first acknowledging response is detected when the second message is sent out therefrom, and does not perform transmission of the message until the transmission right is acquired next time, whereas the each of the plurality of control systems sends out the first message to continue the transfer of the transmission right when the first acknowledging response is not detected.

The above and other object, features, and advantages of the invention will become more apparent from the following detailed description taken in conjunction with the accompanying drawings.

BRIEF DESCRIPTION OF THE DRAWINGS

FIG. 6a to FIG. 6d collectively form a timing chart which is useful in explaining a manner of mediation for settling contention for the transmission right, in which:

FIG. 6a shows bit Nos.;

FIG. 6b shows data transmitted from a node 1;

FIG. 6c shows data transmitted from a node 2; and

FIG. 6d shows logical levels on a bus;

DETAILED DESCRIPTION

The invention will described in detail with reference to drawings showing an embodiment thereof.

Figure 1:
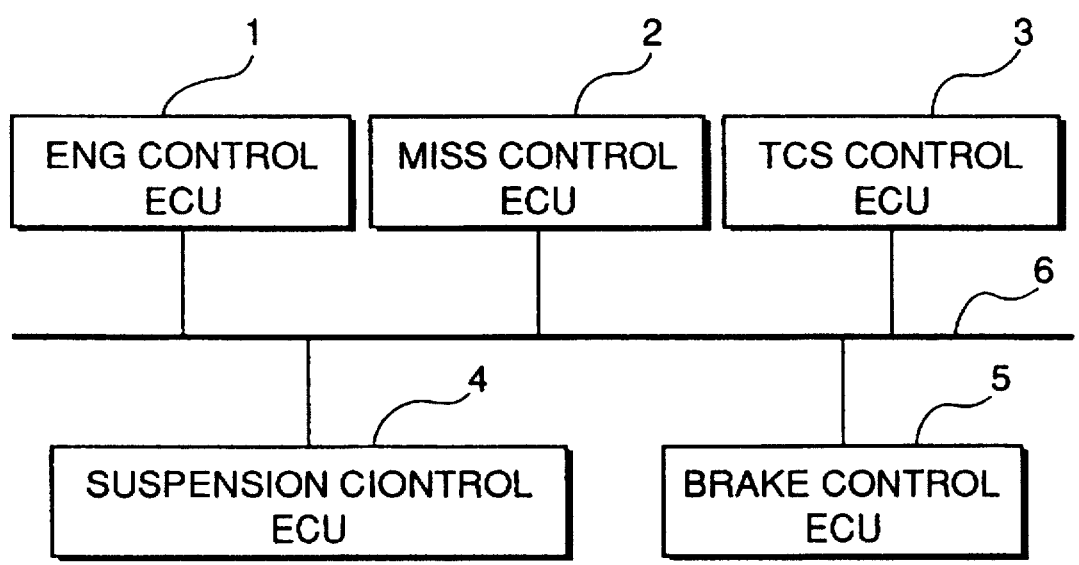
FIG. 1 is a block diagram showing the whole arrangement of a control system for an automotive vehicle according to an embodiment of the invention.

FIG. 1 shows the whole arrangement of a control system for an automotive vehicle according to the embodiment comprising electronic control units (hereinafter referred to as "the ECU's") 1 to 5 connected with each other via a network bus 6. An ENG control ECU 1 controls operation of an engine in response to operation of an accelerator pedal operated by a driver of the vehicle, etc. An MISS control ECU 2 controls an automatic transmission of the vehicle according to the operating conditions of the engine. A TCS control ECU 3 detects a slip of driving wheels and controls an output torque of the engine. A suspension control ECU 4 controls a suspension (active suspension) system of the vehicle depending on the operating conditions of the engine. A brake control ECU 5 detects a slip of wheels and controls braking operation. These ECU's 1 to 5 are required to be permitted to mutually monitor control parameters and operating parameters detected by sensors, some of the sensors being collectively shown in FIG. 2, and hence are connected to each other by way of the network bus 6 for transmission of data necessitated by each other.

Figure 2:
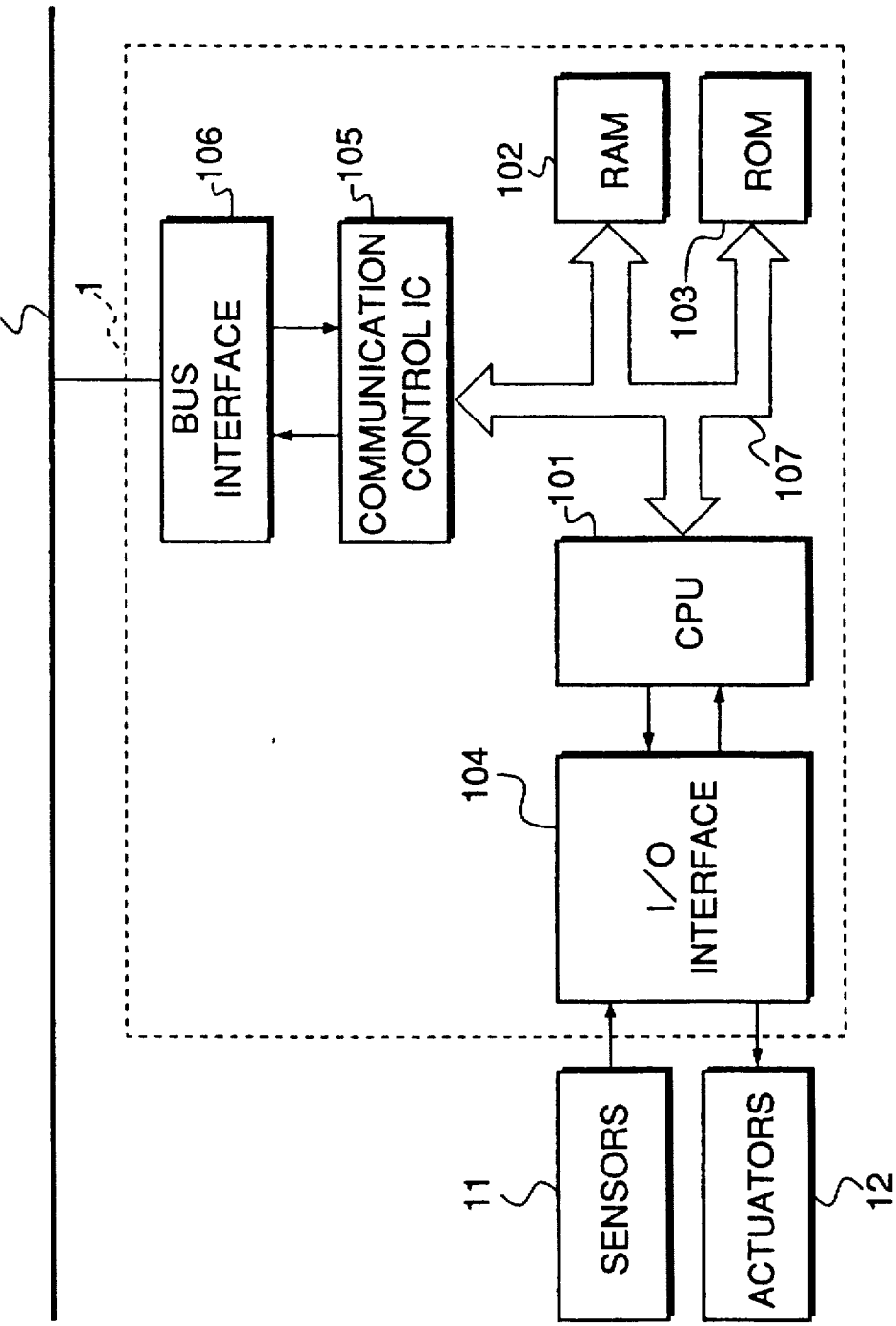
FIG. 2 is a block diagram showing the arrangement of an electronic control unit appearing in FIG. 1.

FIG. 2 shows the arrangement of the ENG control ECU 1 which comprises a central processing unit (hereinafter referred to as "the CPU") 101, an input/output interface 104 connecting a plurality of sensors 11, and a plurality of actuators, such as fuel injection valves, to the CPU 101. The CPU 101 is connected via a bus line 107 to a RAM (Random Access Memory) 102, a ROM (Read Only Memory) 103, and a communication control IC (Integrated Circuit) 105. The communication control IC 105 is connected via a bus interface 106 to the network bus 6.

The CPU 101 determines control parameters based on output signals from the sensors 11 according to a program stored in the ROM 103 for driving the actuators 12. The RAM 102 temporarily stores data of results of computation. The communication control IC controls transmission of a message to the network bus and reception of a message from the network bus.

Figure 3:
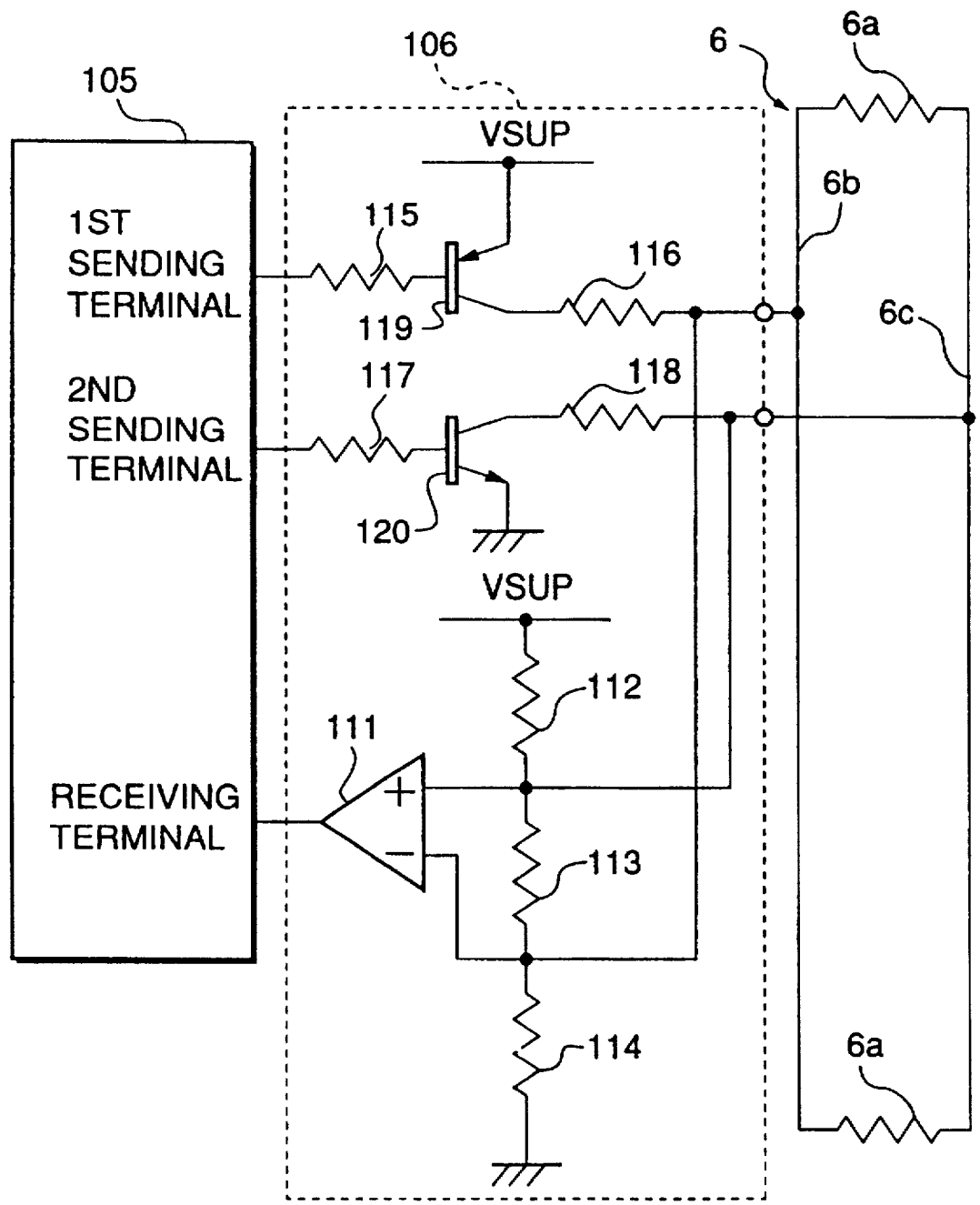
FIG. 3 is a circuit diagram showing details of a bus interface appearing in FIG. 2.

FIG. 3 shows details of the bus interface 106 connected to the communication control IC 105, and the network bus 6 comprised of twisted pair lines 6b and 6c connected at both ends of thereof to each other via respective terminal resistances 6a, 6a.

The communication control IC 105 has a first sending terminal connected to a base of a transistor 119 via a resistance 115. The transistor 119 has an emitter thereof connected to a power supply line VSUP and a collector thereof connected via a resistance 116 to an inverting input terminal of a comparator 111 and to one 6b of the twisted pair lines 6b and 6c.

The communication control IC 105 has a second sending terminal connected to a base of a transistor 120 via a resistance 117. The transistor 120 has an emitter thereof grounded and a collector thereof connected via a resistance 118 to a non-inverting input terminal of the comparator 111 and to one 6c of the twisted pair lines 6b and 6c.

The non-inverting input terminal of the comparator 111 is connected via a resistance 112 to the power supply line VSUP, and also via a resistance 113 to the inverting input terminal of the comparator 111. The comparator 111 has its inverting input terminal grounded via a resistance 114, and delivers an output signal therefrom to a receiving terminal of the communication control IC 105.

In the circuitry shown in FIG. 3, the resistances 116 and 118 are each set to approximately 30 Ω, the resistances 112 and 114 to approximately 2 k Ω, the resistance 113 to approximately 200 Ω, and the terminal resistances 6a to approximately 100 Ω.

The first and second sending terminals of the communication control IC 106 are supplied with pulse signals reverse to each other in phase. When the first sending terminal is at a low level and the second sending terminal is at a high level, both the transistors 119 and 120 are turned on to set the voltage of the one twisted pair line 6b at the high level and the other twisted pair line 6c at the low level. When the first sending terminal is at the high level and the second sending terminal is at the low level, both the transistors 119 and 120 are turned off to set the voltage of the one twisted pair line 6b at the low level and the other twisted pair line 6c at the high level. Thus, a signal is sent out to the network bus 6.

As the potential of the one twisted pair line 6b goes high and low, the output from the comparator 111 goes low and high, thereby receiving a signal loaded on the network bus 6.

The ECU's 2 to 5 are basically constructed in the same manner. Therefore, even if one of the ECU's sends out a signal which sets the voltage of the one twisted pair line 6b at the low level (i.e. sets the voltage of the other twisted pair line 6c at the high level), when another ECU sends out a signal which sets the voltage of the one twisted pair line 6b at the high level, the state of the voltage of the twisted pair line 6b is set to the high level. Therefore, in the present embodiment, a state in which the one twisted pair line line 6b is at the high level (the other twisted pair line 6c is at the low level) is defined as a dominant state, and an opposite state thereof as a recessive state.

Next, a method of data transmission between the ECU's will be described. In the present embodiment, a token passing method is employed. This takes into consideration the fact that compared with a CSMA/CD (Carrier Sense Multiple Access with Collision Detection) method which is capable settling the collision, the token passing method is advantageous in respect of an electric delay on the network bus, and is capable of easily determining the maximum message delay time period, allowing the network system to be be designed easily.

Figure 4A:
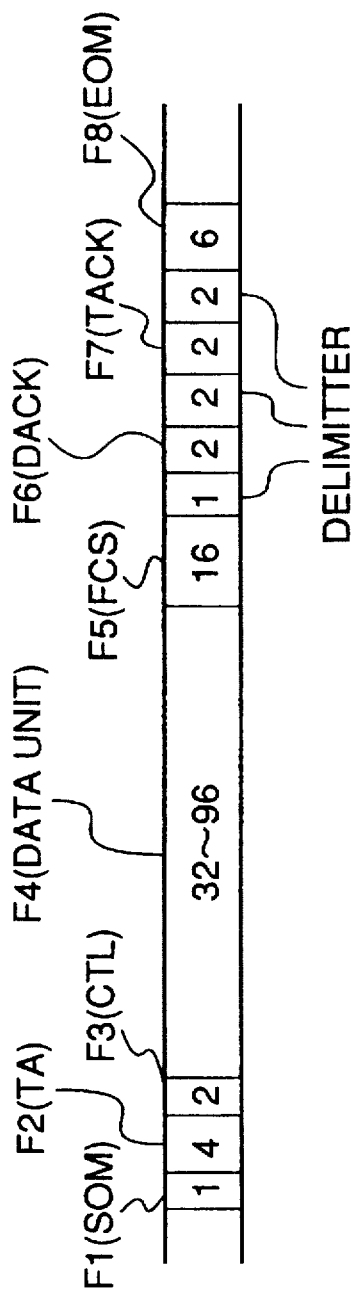
FIG. 4a is a diagram showing a format of a message containing a data unit for transmission between electronic control units.
Figure 4B:
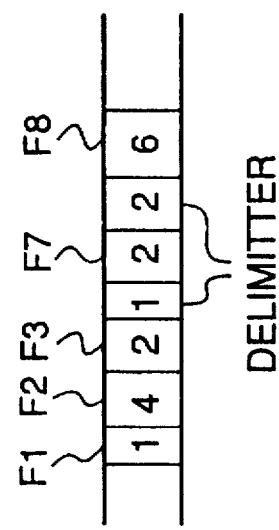
FIG. 4b is a diagram showing a format of a message containing no data unit.

FIG. 4a and FIG. 4b show formats of messages used in data transmission in the present embodiment. FIG. 4a shows a format of a data message (second message) for sending a token (representative of the transmission right) and data, while FIG. 4b shows that of a token message (first message) for sending the token alone. In the following description, the ECU's constituting the network system will be referred to as the nodes 1 to 5.

In FIG. 4a, a field F1 (SOM) notifies the start of a message, which is formed by one dominant bit. This field is used for synchronization of all the nodes constituting the network system.

A field F2 (TA) designates an address of a destination node to which the token is to be transferred, which is formed by four bits of data. The node address is set e.g. to one of values 0 to 4 in a manner corresponding to the ECU's 1 to 5.

A field F3 (CTL) designates a kind of message (token message or data message).

A field F4 (DATA UNIT) is a data unit comprised of a DN (Destination Node) field designating a node or nodes which should receive data contained in a DATA field, a DLC (Data Length) filed designating the length of a byte of the DATA field, an ID (Identifier) filed forming an identifier of the data, and the DATA filed containing information to be transmitted.

In this connection, the length of the DATA field is variable as can be presumed from the above description, and the total length of the data unit is variable within the range of 32 to 96 bytes.

A field F5 (FCS) is a CRC (Cyclic Redundancy Check) field comprised of a sequence (CRC character sequence) of characters for error detection having 16 bits obtained by using the following equation (1) as a generating polynomial:

Generating polynomial=$x^{16}+X^{12}+X^5+1$

A delimitter (dividing character) having one recessive bit is interposed between the field F5 and the field F6.

A field F6 (DACK) is a second response field into which a data-acknowledging response (second acknowledge character) should be written by a node having normally or safely received the data, which is formed by an acknowledge slot having two bits. A sending node sends a message having the acknowledge slot as recessive bits, and the node or nodes which is/are designated in the message as one or ones to receive the information and has/have normally or safely received the data make(s) the data-acknowledging response by overwriting two dominant bits therein. A delimitter having two recessive bits is interposed between the fields F6 and F7.

A field F7 (TACK) is a first response field into which a token-acknowledging response (first acknowledge character) should be written by a node having normally or safely received the token, which is formed by an acknowledge slot having two bits, similarly to the field F6. The sending node sends a message having the acknowledge slot as recessive bits, and the node having received the token makes the token-acknowledging response by overwriting two dominant bits therein. A delimitter formed by two recessive bits is interposed between the filed F7 and the field F8.

A field F8 (EOM) designates the end of the message, and is formed by six recessive bits.

In the present embodiment, the field F7 and the field F6 are provided as fields into which acknowledgement of the token and acknowledgement of data are made, respectively, which makes it possible for a sending end to promptly confirm whether or not the transfer of the token and the transmission of data have been successfully carried out.

The token message shown in FIG. 4b is constructed such that the fields F4 to F6 are deleted from the data message, and a delimitter is interposed between the fields F3 and F7.

Next, a method of circulating the token (transferring the token round the ECU's) will be described.

If a node having received the token has data or information to be transmitted, it has to transfer the token together with the data. If the node has no data or information to be transmitted, it has to transmit the token alone. A node to which the token is to be transferred is a node designated in the field F2 (TA). The token address is normally set by adding a value of one to the address of the sending node itself, and a message continues to be sent out until a token-acknowledging response is detected, by sequentially increasing the token address by an incremental value of 1. However, when a calculated value of the token address reaches a value of 16, the token address is set to 0, thus circulating token address through values of of 0 to 15.

When the node corresponding to the token address set in the message has received the token, it overwrites two dominant bits into the acknowledge slot of the field F7 (TACK), thereby making the token-acknowledging response. When the token-acknowledging response is thus overwritten and the message normally terminates in the field F8 (EOM), the sending node having sent the token completes the transfer of the token, and the receiving node has acquired the token.

Next, a manner of detecting failure in transmission of a message will be described.

When roughly classified, there are two types of failure in transmission: one in which there has been no transmission error but no data-acknowledging response is overwritten in the field F6 (DACK) of the acknowledge slot, and the other in which a transmission error has been detected during transmission of a message. When no data-acknowledging response has been made, this type of failure of transmission is detected by the sending node itself.

On the other hand, the transmission error is detected by monitoring of data, detection by CRC, detection of bit stuff error, and a message format check.

According to the error detection by monitoring of data, a transmission error is detected when data a sending node is transmitting does not coincide with data loaded on the bus. However, this monitoring of data is inhibited with the acknowledge slots of the fields F6 and F7, and one recessive bit subsequent thereto.

According to the error detection by CRC, a transmission error is detected when an error is found as to CRC characters set in the field F5 (FCS), and this detection is performed by nodes other than the sending node.

According to the bit stuff error detection, it is determined that there is an error in transmission when more than 5 consecutive bits designate the same logical state, and this detection is performed by nodes other than the sending node. However, the fields F6 (DACK), F7 (TACK), F8 (EOM) and the delimitters are executed from objects of monitoring.

According to the error detection by the message format check, an error is detected when an illegal logical state is found in the fields of the fixed-logical-state bits (the fields F3, F8 and the delimitters), and this type of error detection is performed by nodes other than the sending node.

When any of the above-described errors occurring during transmission is detected, a node having detected the error immediately sends out an error message (six consecutive dominant bits), whereby even if a transmission error is detected by a node or nodes other than the sending node, the sending node can recognize the transmission error.

Next, a procedure of generating the token or initially rendering the token to one of the nodes when the token has not been generated or lost from the data transmission system will be described with reference to FIG. 5 and FIG. 6.

Figure 5:
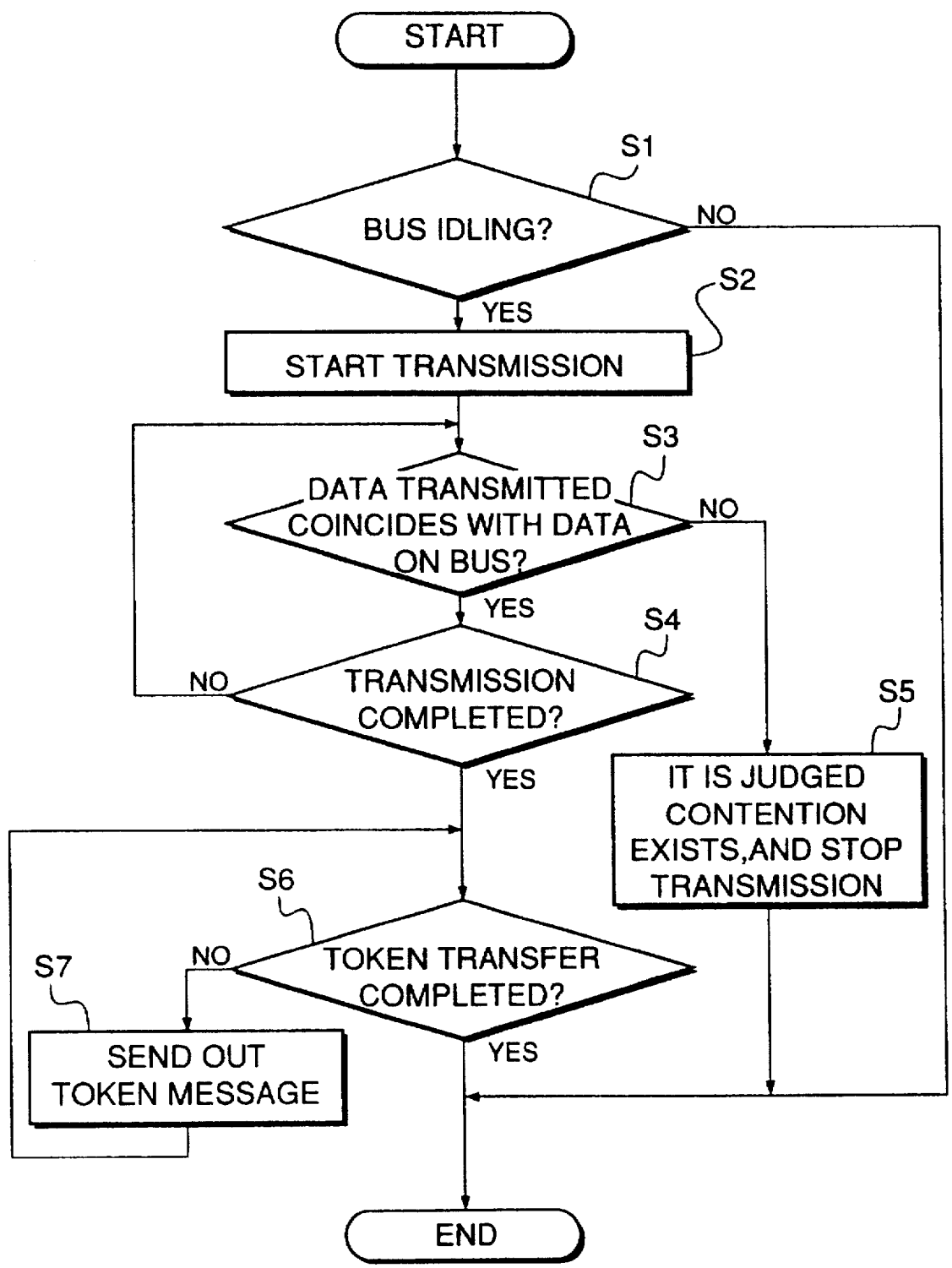
FIG. 5 is a flowchart showing a program for initially generating a token (transmission right) when the token has not been generated or lost.
Figure 6:
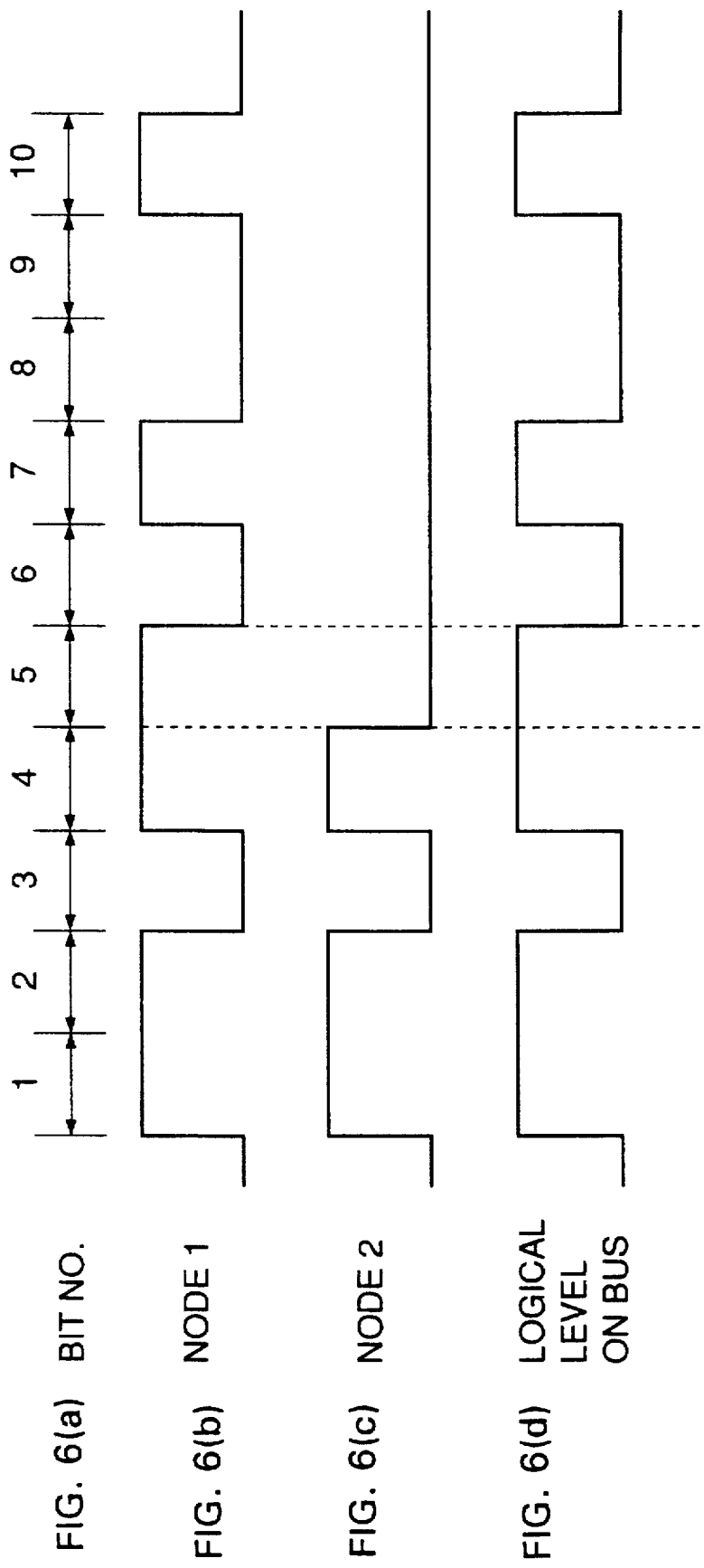

The communication control IC 105 of each of the ECU's 1 to 5 determines at a step S1 of FIG. 5 whether or not the network bus is idling, to determinate whether the data transmission system is in a state in which the token has not been generated immediately after the start of system, or has been lost due to failure of a node having received the token.

If the answer to this question is negative (NO), i.e. if another ECU is sending a message, the present program is immediately terminated.

On the other hand, if the network bus 6 is idle, i.e. no other ECU's are sending any message, the present ECU starts data transmission via the communication control IC 105 and the bus interface 106 at a step S2, assuming that the present node has acquired the token. Then, data sent from the present node is compared with data on the network bus 6 bit by bit to determine whether both the data are identical to each other at a step S3. If the answer to this question is affirmative (YES), i.e. the data sent out and the data on the network bus coincide with each other, it means that there is no contention between the data sent out from the present node and data from other nodes, or the present node remains undefeated in contention for acquiring the token, and hence data transmission is continued assuming that the present node has not lost the token yet. That is, the present program proceeds to a step S4, where it is determined whether or not transmission of the whole sequence of data has been completed. If the answer to this question is negative (NO), the program returns to the step S3, where data subsequently sent out is compared with data loaded on the network bus, in the same manner as described above.

It goes without saying that there is a case in which the present node is found to be defeated in contention for acquiring the token to stop data transmission when the above-described procedure is carried out. Further, as a method of determining whether the data sent from the present node and the data loaded on the system bus coincide with each other, the above-mentioned method of the error detection by monitoring data is utilized for determining that the data sent out and the data loaded on the system bus do not coincide with each other. In the present case, more specifically, the coincidence of the data is determined by calculating an exclusive OR of the data sent out and the data received from the network bus 6.

On the other hand, if the data sent out from the present node is different from the data loaded on the network bus 6, it means that there has been a contention for the token with other nodes, and the present node has been defeated in the contention, so that the data transmission is stopped at a step S5, followed by terminating the present program.

If it is determined at the step S4 that the whole sequence of data has been sent out, i.e. if it is determined that the present node remains undefeated throughout the contention for acquiring the token, it is determined at a step S6 whether or not the transfer of the token has been completed, by making a check for the token-acknowledging response. If the transfer of the token has not been completed, a value of 1 is added to the token address of the token message, and then the resulting token message is sent out to the network bus 6 at a step S7 The steps S6 and S7 are repeatedly carried out until the transfer of the token is completed, whereupon the present program is terminated.

Further, in determining a winner of contention, data formed by an identical sequence of bits is actually sent out a plurality of times for prevention of an erroneous determination due to noise or the like.

Next, details of a manner of determining a winner of the contention will be described with reference to FIG. 6a to FIG. 6d.

Let it be assumed that data are transmitted from Node 1 and Node 2 as shown in FIG. 6b and FIG. 6c, respectively. As described hereinbefore, a bit in the logical state "1" is a dominant bit, and a bit in the logical state "0" is a recessive bit. If contention occurs between the dominant bit and the recessive bit, the logical state on the network bus becomes equal to "1".

In the case of data shown in FIG. 6b and FIG. 6c, bits corresponding to the bit numbers 1 to 4 shown in FIG. 6a are in the same logical states, respectively, and the logical states of the data sent from Node 1 and Node 2, and the logical state of the network bus are all equal to each other. Accordingly, Node 1 and Node 2 both continue to send out respective messages from bit No. 1 to bit No. 4.

However, at bit No. 5, the logical state of data sent from Node 1 is equal to "1", whereas the logical state of data sent from Node 2 is equal to "0". Accordingly, the logical state of the network bus becomes equal to the logical state "1" of the dominant bit sent from Node 1. Therefore, Node 1 having sent the dominant bit determines that it has not lost the token and continues to send the message, whereas Node 2 having the sent the recessive bit determines that it has lost the token and ceases to send the message.

In this connection, FIG. 6a to FIG. 6d show a case where two nodes are in contention for the token. However, actually, there can occur a case in which a contention for the token arises among more than two nodes. However, it is impossible for all the nodes to continue sending the same sequence of data, and eventually, one node is necessarily determined to remain undefeated in the contention, without any inconveniences.

As can be clearly understood from the above description, according to the present invention, when the control system is started or a node having received the token is in failure, a token is generated or initially given to one of the nodes by contention for the token as described above, and then the token is circulated through or transferred round the nodes. This makes it possible to promptly generate the token by giving a chance of acquiring the token equally to all the nodes, enabling the system to function efficiently.

Further, the present invention is not limited to the above embodiment, but as a manner of mediation of contention, the logical state "0" may be used for a dominant bit and the logical state "1" for a recessive bit, inversely to the above embodiment. Further, after the token has been generated through contention, a node to which the token is first transferred is not necessarily restricted to a node having a node address following the address having initially acquired the token, but the token may be first transferred to a predetermined node having the smallest node address, then permitting the node to circulate through the nodes in a predetermined cycle.

Next, a procedure of processing performed when no data-acknowledging response has been received after a sending node has sent a data message. In the following description, the first acknowledge character to be overwritten into the field F7 is referred to as "the token ACK", while the second acknowledge character to be overwritten in the field F6 as "the data ACK".

(1) When the token ACK is not detected and the data ACK is detected:

The token data address is increased by an incremental value of 1 and then the resulting token message is sent out. This is for transferring the token alone to a node subsequent to the node to which the token has not been successfully transferred, since reception of the data written in the field F4 has been acknowledged.

(2) When the token ACK is detected, and the data ACK is not detected:

Since the transfer of the token is completed, retransmission of data is not carried out. The data is retransmitted, if possible, when the token is acquired next time.

(3) When neither the token ACK nor the data ACK is detected:

The token address is increased by an incremental value of 1 and the token message containing the resulting token address is transmitted, but the is retransmission of data is not carried out. Thus, the circulation of the token is performed in preference to the transmission of data to permit smooth circulation of the token. Further, the data is transmitted again, if possible, when the token is acquired next time.

As described above, even if the data ACK is not detected, it is judged, so long as the token ACK is detected, that the transfer of the token is completed, and the retransmission of data is inhibited. Further, when neither the data ACK nor the token ACK is detected, only the transfer of the token is tried again without retransmitting the data, whereby it is possible to circulate the token smoothly. The preference is given to the transfer of the token since the retransmission of data performed immediately after detection of a transmission error requires the maximum delay time of the system to be set to a longer time period than when the transfer of the token is preferentially performed as in the present embodiment.

Figure 7:
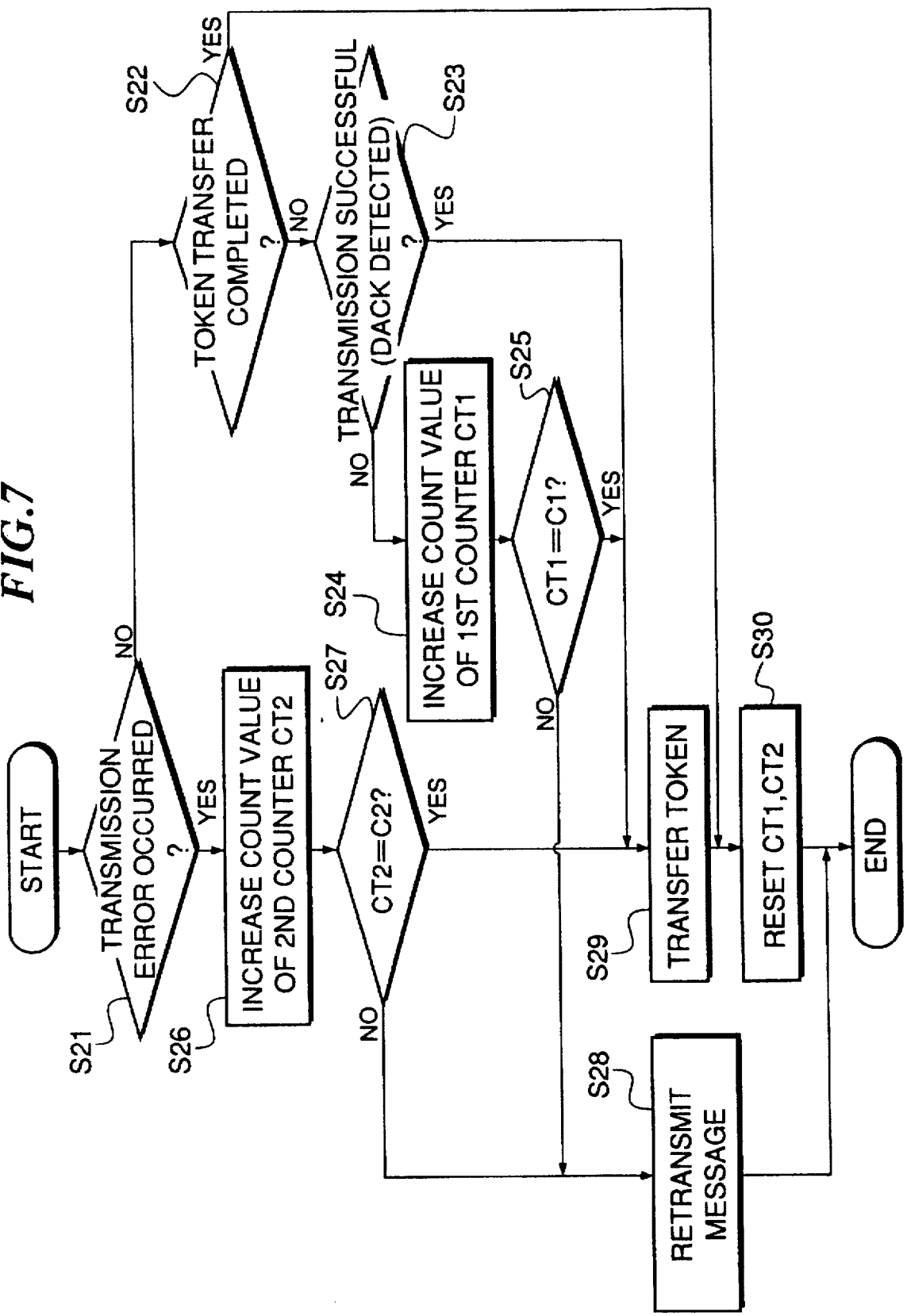
FIG. 7 is a flowchart showing a program for terminating the data transmission.

Although in the above example, when neither the token ACK nor the data ACK is detected, the token message is permitted to be sent out immediately, and at the same time retransmission of data is inhibited, this is not limitative, but the transfer of the token may be performed after retransmission of data is tried one or two times. FIG. 7 shows this variation of the procedure of transmission control performed by the communication control IC 105 for terminating the transmission upon completion of the sending of the message or upon detection of an error message.

In the following description, it should be understood that an error in transmission is detected by a sending node or a receiving node, whereupon an error message is sent out from the node having detected the error, thereby terminating the transmission.

At a step S21 of FIG. 7, it is determined whether or not an error has occurred to transmission. If the answer to this question is negative (NO), it is determined at a step S22 whether or not the transfer of the token is completed (whether or not the token ACK is detected). If the transfer of the token has been completed, first and second counters CT1, CT2, referred to hereinafter, are reset at a step S30, followed by terminating the present program. If the answer to the question of the step S22 is negative (NO), i.e. if no error has occurred during the transmission, but the transfer of the token is not completed, the program proceeds to a step S23, where it is determined whether or not the data has been successfully transmitted (whether or not the data ACK is detected). If it is determined that the data has been successfully transmitted, the transfer of the token is performed at a step S29, and then the first and second counters CT1, CT2 are reset at the step S30, followed by terminating the program.

On the other hand, if the answer to the question of the step S23 is negative (NO), i.e. if no error has occurred during the transmission, but neither the transfer of the token nor the transmission of the data is successfully carried out (neither the token ACK nor the data ACK is detected), the program proceeds to a step S24, where an count value of the first counter CT1 is increased by an incremental value of 1, and it is determined at a step S25 whether or not the resulting count value of the first counter CT1 is equal to a first predetermined value C1 (which is set e.g. to a value of 2). When this step is first carried out, CT1 <C1 holds, so that retransmission of the message which has not been successfully transmitted is performed at a step S28, followed by terminating the program. If the acknowledging responses (the token ACK and the data ACK) continue not to be detected thereafter until CT1 =C1 holds at the step S25, the program proceeds therefrom to the step S29, where the token is transferred by the token message, and the counters CT1, CT2 are reset, at the step S30, followed by terminating the program.

If the answer to the question of the step S21 is affirmative (YES), i.e. if an error has occurred to transmission, a count value of the second counter CT2 is increased by an incremental value of 1 at a step S26, and it is determined at a step S27 whether or not the resulting count value of the second counter CT2 is equal to a second predetermined value C2 (which is set e.g. to a value of 5). When this step is first carried out, CT2 <C2 holds, so that the retransmission of the message which has not been successfully transmitted is performed at the step S28, followed by terminating the program. If the transmission error continues to occur until CT2=C2 holds at the step S27, the program proceeds therefrom to the steps S29 and S30, followed by terminating the program.

According to the processing of FIG. 7, when transmission of a data message has not been successfully carried out, retransmission of the message is carried out up to the maximum number C1−1 of times when the data- and token-acknowledging responses (acknowledge characters DACK, TACK) are detected, or alternatively up to the maximum number C2−1 of times when an error in transmission has occurred. If transmission of the message cannot be successfully carried out even if it is tried the maximum number of times set as above, the token is transferred by the token message.

Since the second predetermined value C2 is larger than the first predetermined value C1, the maximum number of times of retransmission is larger for an error in transmission than for no acknowledge characters DACK and TACK. This is because in the case where no acknowledge characters are detected, there is a high possibility of absence of a node or nodes to receive the message, which means a high possibility of failure in transmission even if the message is retransmitted, whereas in the case where an error in transmission is detected, there is a high possibility of the error having been caused by an external disturbance, which means a high possibility of success in retransmission.

Further, if the transmission continues to be unsuccessful, the token is transferred by the token message to thereby circulate the token smoothly.

As described above, according to the present embodiment, when transmission of a message is unsuccessful, the message is retransmitted a number of times dependent on a possible cause of failure in transmission, and if the transmission still continues to be unsuccessful, the token is transferred by the token message, thereby reducing the number of useless retransmissions to circulate the token smoothly. As a result, the efficiency of the data transmission by the data transmission system as a whole can be enhanced.

Next, a manner of detecting abnormality of the system according to the invention will be described with reference to FIG. 8.

Figure 8:
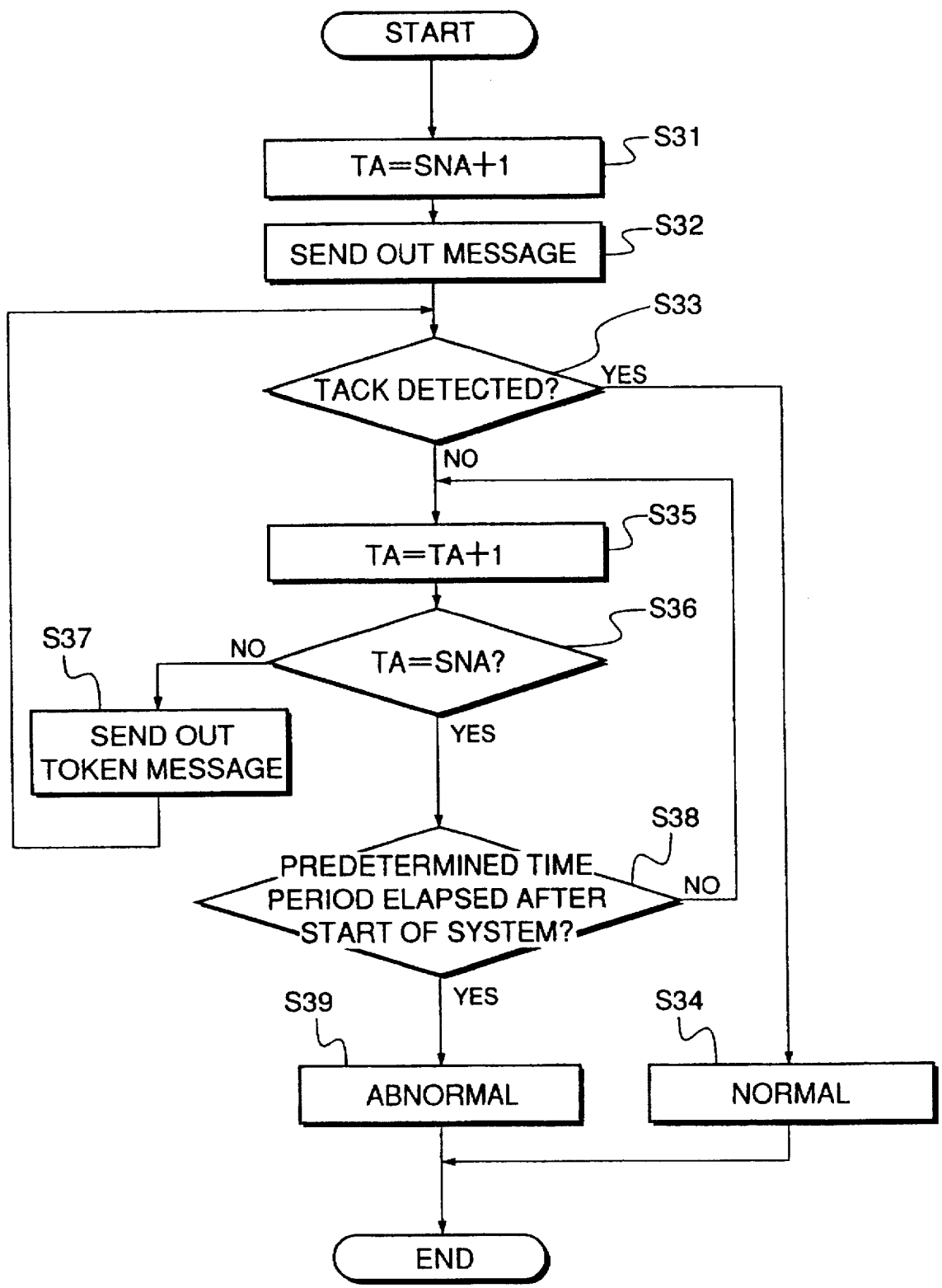
FIG. 8 is a flowchart showing a program for transferring the transmission right.

FIG. 8 shows a procedure of one node transferring the token to the subsequent node. First at a step S31, the present node sets a token address TA to a value obtained by adding a value of 1 to an address SNA of its own, and transmits a data message or a token message containing the resulting token address at a step S32. Then, it is determined at a step S33 whether or not a token-acknowledging response (the token ACK) acknowledging receipt of the token has been detected. If the token ACK has been received or detected, it is determined at a step S34 that the system is normally functioning, followed by terminating the program.

If the token ACK has not been detected, the token address TA is increased by an incremental value of 1 at a step S35, and then it is determined at a step S36 whether or not the resulting token address TA is identical to the address SNA of the present node. When this step is first carried out, TA is not equal to SNA, and hence the program proceeds to a step S37, where the updated token message is sent out, followed by the program returning to the step S33. If the token ACK continues not to be detected thereafter, the token address TA is sequentially increased. In the present embodiment, when the token address TA becomes equal to 15, the subsequent token address TA is set to 0, and then progressively increased in the same manner. For example, if the present node has an address SNA of 2, the token address TA is sequentially changed in the order of 3 → 4 → ... → 15 → 0 → 1 → 2, and when the token address TA becomes equal to the address SNA of the present node, the program proceeds to a step S38, where it is determined whether or not a predetermined time period has elapsed (e.g. a time period required to permit all the ECU's to become operative or active after the start of the control system, e.g. one second) has elapsed. If the predetermined time period has not elapsed, transmission of the token message is resumed at the step S35 with the token address TA being started from TA=SNA+1, whereas if the predetermined time period has elapsed, it is determined at a step S39 that the system is abnormal, followed by terminating the program. The abnormality of the system is ordinarily interpreted as a state of the present node being disconnected from the network bus, although it is theoretically possible to assume a case in which all the other nodes are disconnected from the network bus or in failure. Further, the reason for inhibiting the abnormality determination until the predetermined time period elapses after the start of the control system is that each node has its own rise time, i.e. the nodes, i.e. the ECU's, require different time periods before they become operative, respectively, and before the predetermined time period elapses, there can be a case in which some ECU cannot respond to the token message.

According to the FIG. 8 processing, the abnormality of the system can be determined while performing the transfer of the token, so that other processings can be continued, without being interrupted, which is impossible for the method employing a special message. This makes it possible to detect the abnormality of the system without degrading the transmission efficiency of the system.

In addition, the prompt detection of abnormality of the system described above is possible since the data transmission system for an automotive vehicle incorporates a relatively small number of nodes (in the present embodiment, the maximum number thereof is 16) connected to the network bus. That is, the method of detecting abnormality employed by the present system is markedly effective for a system in which the token passing method is used with a relatively small number of nodes.

What is claimed is:

1. A data transmission method comprising:
   connecting a plurality of control systems installed on a vehicle by at least one common signal line, and
   transmitting a message between said plurality of control systems over said at least one common signal line while circulating a transmission right through said plurality of control systems,
   wherein said message comprises a first response field for receiving a first acknowledging response output from one of said plurality of control systems which has received said transmission right, and a second response field for receiving a second acknowledging response output from one of said plurality of control systems which has received data.

2. A data transmission method according to claim 1, wherein a processing corresponding to said first acknowledging response is performed in preference to a processing corresponding to an absence of said second acknowledging response.

3. A data transmission method according to claim 2, wherein:

said processing corresponding to said first acknowledging response comprises one of waiting for a next reception of said transmission right and a continuation of transfer of said transmission right, and said processing corresponding to said absence of said second acknowledging response comprises retransmission of said data.

4. A data transmission method comprising:

connecting a plurality of control systems installed on a vehicle by at least one common signal line, and transmitting a message between said plurality of control systems over said at least one common signal line while circulating a transmission right through said plurality of control systems, wherein said message comprises a first message having a first response field for receiving a first acknowledging response output from one of said plurality of control systems which has received said transmission right, and a second message having a second response field for receiving a second acknowledging response output from one of said plurality of control systems which has received data, wherein if said first acknowledging response is detected after said second message is sent, each of said plurality of control systems judges that transfer of said transmission right is completed irrespective of whether or not said second acknowledging response is detected, so that retransmission of said second message is not performed until said transmission right is next acquired, and wherein if said first acknowledging response is not detected, each of said plurality of control systems sends out said first message to continue transfer of said transmission right.

* * * * *